A. V. ROE.
CONTROLLING GEAR FOR AIRCRAFT.
APPLICATION FILED OCT. 31, 1918.
1,343,850.
Patented June 15, 1920.
6 SHEETS—SHEET 6.
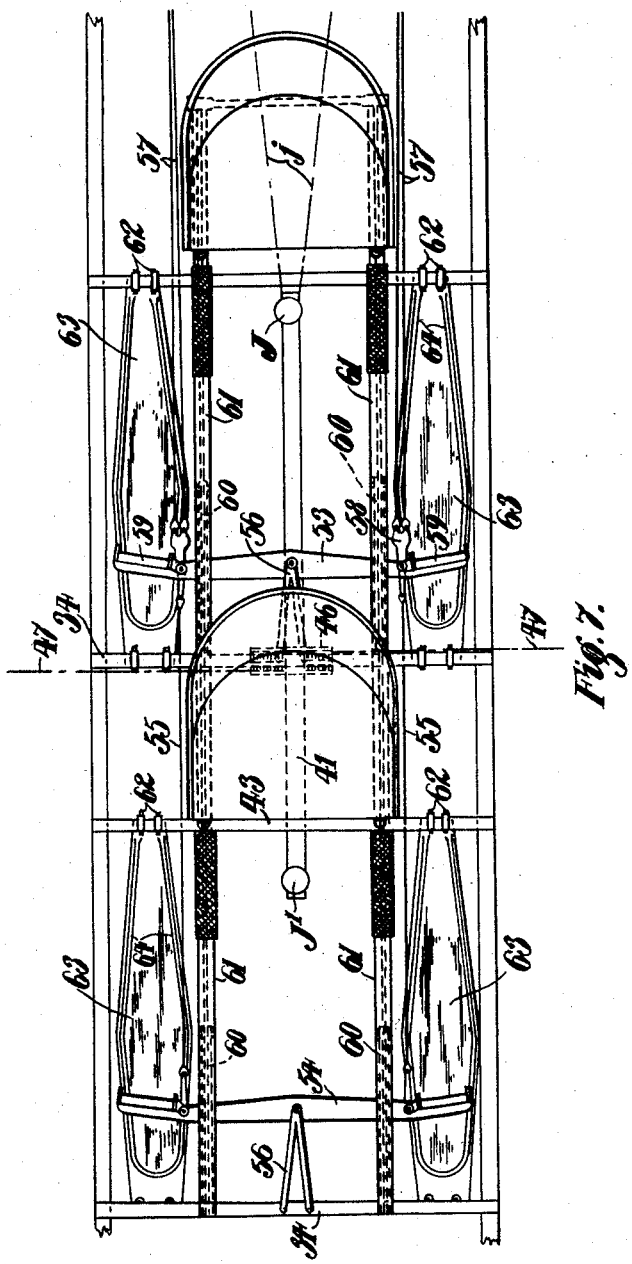
Inventor:
A.V. ROE.
BY Eugene C. Brown
Attorney.

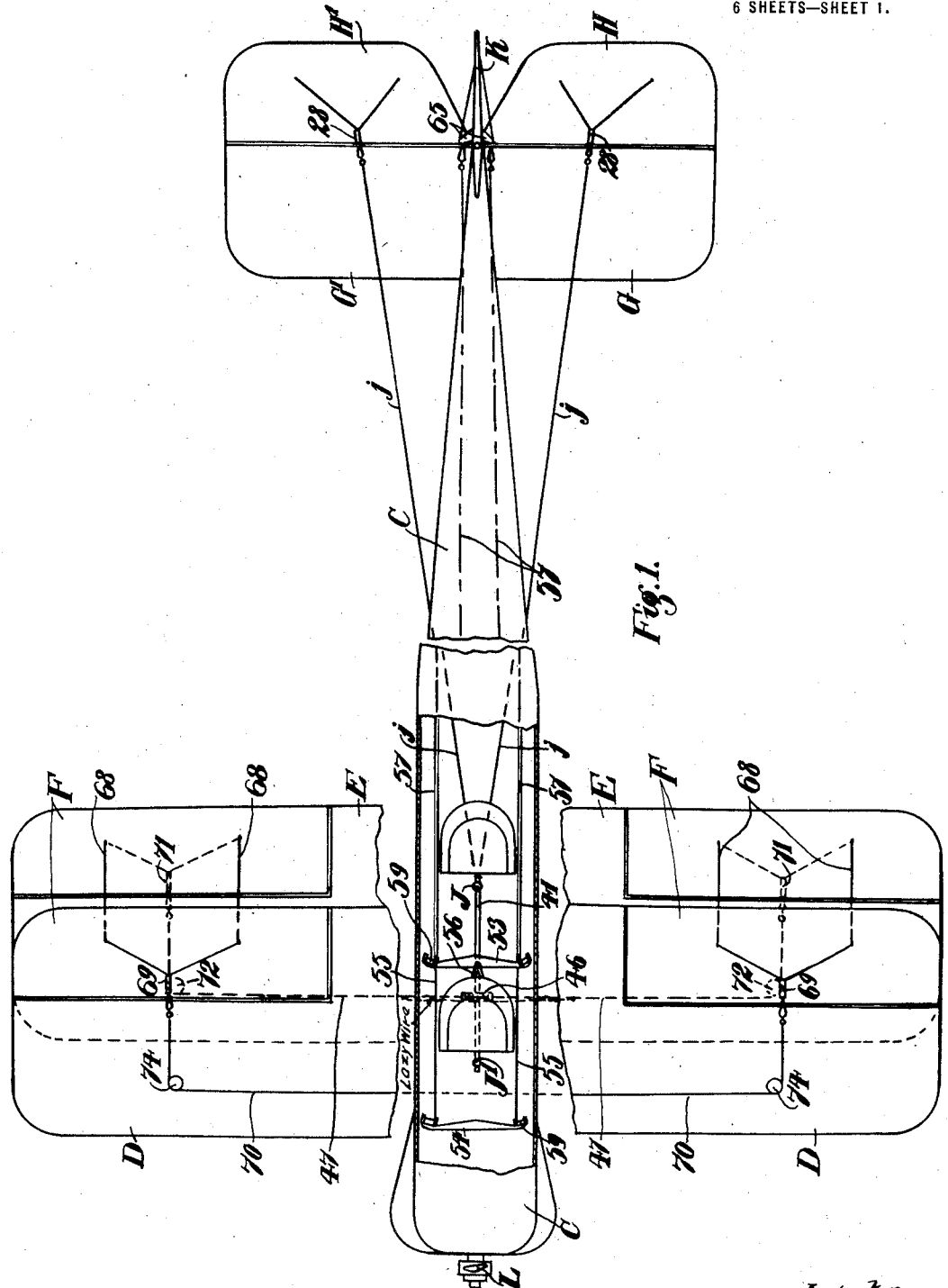

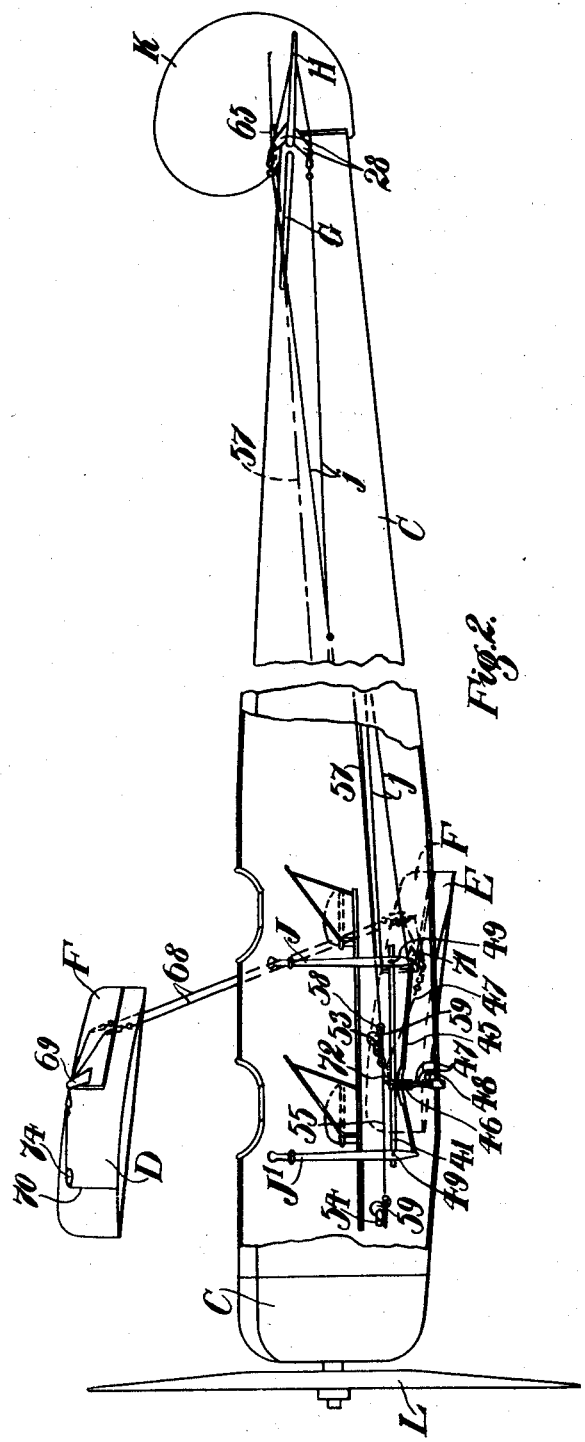

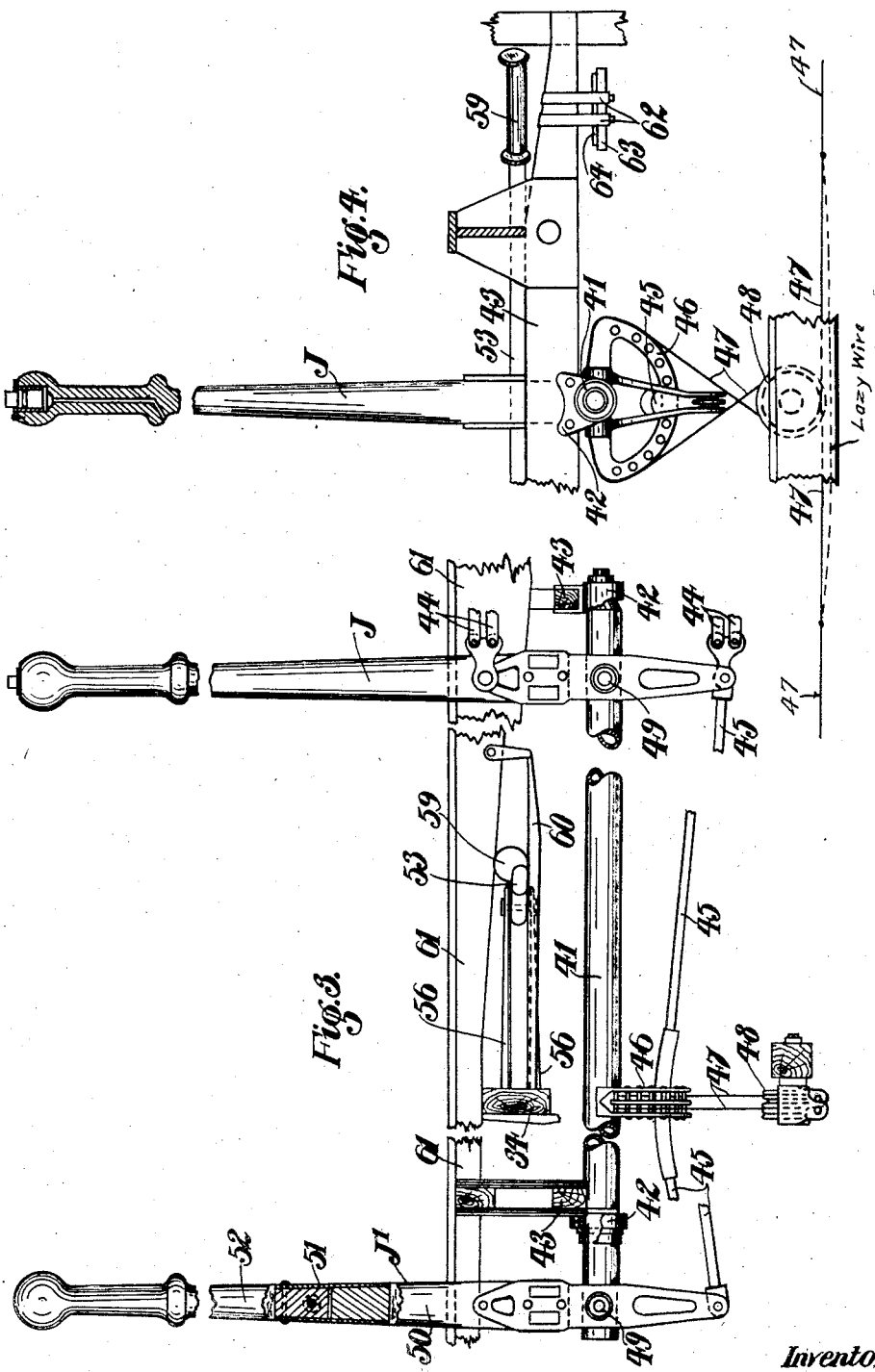

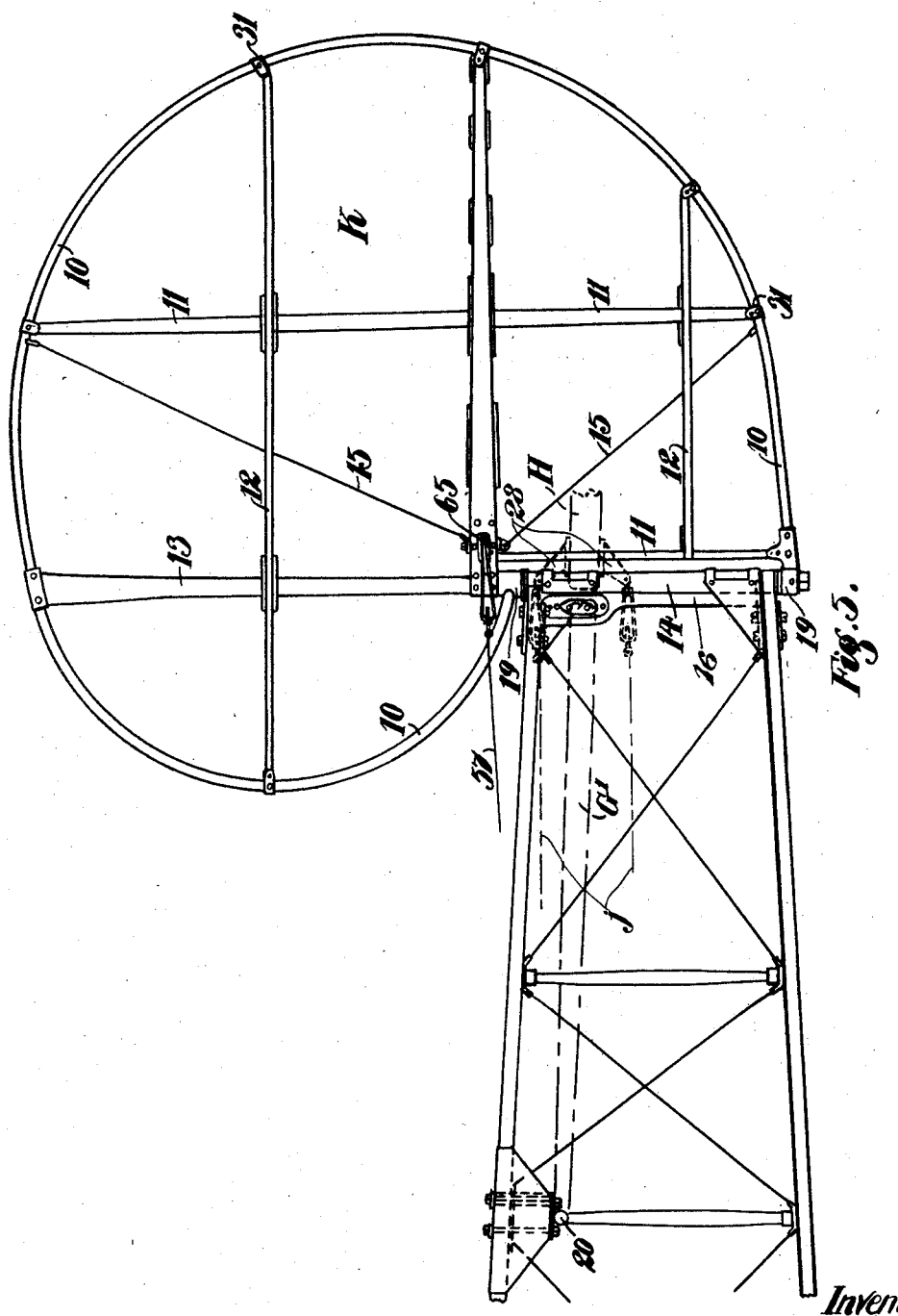

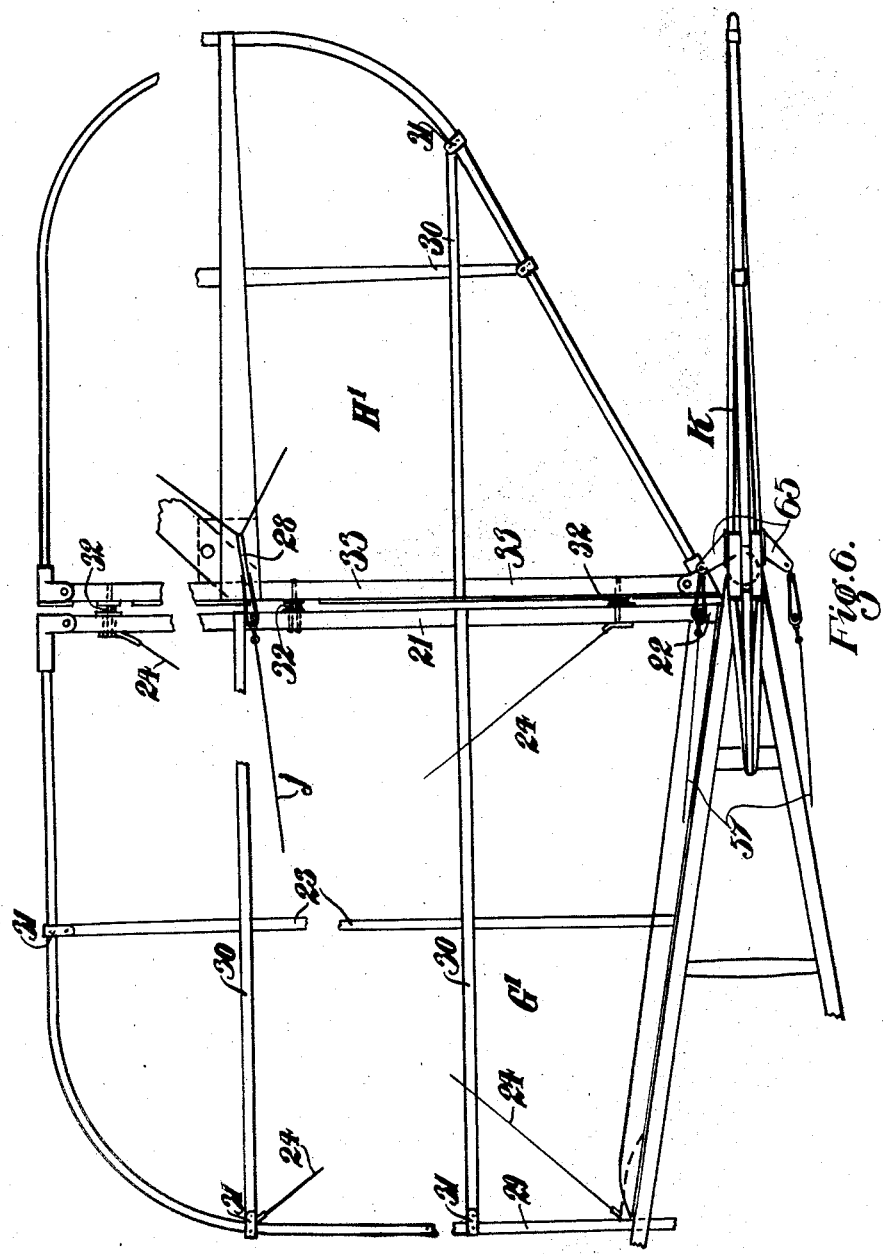

UNITED STATES PATENT OFFICE.

ALLIOTT VERDON ROE, OF HAMBLE, SOUTHAMPTON, ENGLAND.

CONTROLLING-GEAR FOR AIRCRAFT.

1,343,850.　　　Specification of Letters Patent.　　Patented June 15, 1920.

Application filed October 31, 1918. Serial No. 260,515.

*To all whom it may concern:*

Be it known that I, ALLIOTT VERDON ROE, a subject of the King of Great Britain, residing at Hamble, Southampton, England, have invented certain new and useful Improvements in Controlling-Gears for Aircraft, of which the following is a specification.

My invention relates to control devices or equipment, and more particularly to an improved method of dual control for aeroplanes, and to the coördination of the several controlling members with the said dual control.

The object of the invention is firstly, to simplify the connections of a hand control lever or "joystick" with the several members used for controlling the flight of an aeroplane, and secondly to interconnect these devices with a pair of control levers so that either one or the other may be used to control the aeroplane as may be most convenient, desirable, or necessary under adverse circumstances of flight; more especially in regard to such adverse circumstances I have in mind the position of an observer in a fighting aeroplane if his pilot should be maimed or otherwise incapacitated.

To this end, it is of the greatest importance that a dual control should be available and that it should be of a simple character and possess certain features which are more particularly pointed out hereinafter. A further object of the invention is to enable an instructor to teach an inexperienced person by actual experience how to operate the controls when flying.

I will describe one form of aeroplane embodying my invention, and will then point out the novel features thereof in claims.

In the drawings, like numerals of references designate like or corresponding parts throughout the several views, in which:—

Figure 1 is a view showing in plan one form of aeroplane embodying my invention; Fig. 2 is a view showing in side elevation the aeroplane shown in Fig. 1, but with the main planes on one side, and one side of the fuselage removed in order to show the connection of the control gear with the flight controlling planes; Fig. 3 is an enlarged detail view, showing in side elevation the mechanism constituting the dual control for the tail planes and ailerons; Fig. 4 is a view showing in end elevation the controlling apparatus shown in Fig. 3 as associated with the foot actuated control bar for the vertical rudder; Fig. 5 is an enlarged view showing the tail end of the fuselage and the vertical rudder with the fabric covering removed to show the internal structure; Fig. 6 is a plan view showing in detail the skeleton framework of one fixed tail plane and one elevating plane or horizontal rudder; and Fig. 7 is a plan view showing the foot controls for the vertical rudder.

Referring to the drawings, and particularly to Figs. 1 and 2, I have here shown an aeroplane of the biplane type, which comprises, so far as the parts associated with this invention are concerned, a fuselage C, an upper main plane D, lower main planes E, the said upper and lower planes D and E being provided at their upper rear edges with usual ailerons such as F for controlling the lateral movement of the aeroplane. As shown particularly in Fig. 1 the tail of the fuselage is formed with fixed horizontal planes G, $G^1$, and horizontally connected to the rear or trailing edge of these planes are the horizontal or elevating planes H, $H^1$; pivotally supported between the elevating planes H, $H^1$ is the rudder K, the construction of which will be described in detail hereinafter. The biplane herein shown is of the usual tractor type with an airscrew L at its forward end. The fuselage C is tapered from its forward end to its rear end, and referring now to Figs. 5 and 6, I have here shown a means employed for pivotally supporting the rudder K of the aeroplane, but as this forms no part of the present invention a description of the same will be unnecessary beyond saying that the rudder consists of a scroll shaped rim 10 supported and stiffened by vertical struts 11 and 13, horizontal ribs 12, and bracing wires 15. The main strut 13 is tubular, and its lower end passes through and is rotatable within a tubular socket 14 fixed to the wooden sternpost 16 of the aeroplane, fixed collars 19 being provided upon the tubular socket 14 to position the rudder in a vertical direction and take up end thrust.

In addition to the rudder K the tail unit also comprises the fixed planes such as $G^1$ shown in Fig. 6 and horizontally operating elevating planes such as $H^1$. The fixed tail plane $G^1$ is shown as comprising a quadrilateral plane connected to the fuselage by its framework, its tubular leading edge member being extended to enter a socket 20 (Fig. 5) in the fuselage structure, while its rear spar 21 has a terminal bracket 22 bolted to the upper or thickened portion of the wooden sternpost 14. The framework is internally stiffened by an intermediate spar 23, by ribs 30, and by internal cross bracing 24.

In rudder, tail planes, and elevators, clips such as 31 are employed to connect the tubular contour bends to the wooden internal structure.

The leading spar 33 of either of the elevating planes $H^1$ (or H) is connected with the rear edge of each fixed plane $G^1$ (or G) by means of hinges 32, whereby the plane is free to swing about a horizontal axis as a center, the operation of the plane $H^1$ being effected by means of cables $j$ acting through the levers 28.

Referring now to Figs. 3 and 4, for the dual control of the ailerons and elevating planes, I provide a pair of control levers or "joysticks" J and $J^1$, operated by hand, which are disposed directly in front of the pilot's and passenger's seats respectively. These control levers J and $J^1$ are pivoted adjacent their lower ends at 49, 49 adjacent the opposite ends of a horizontally disposed shaft 41, journaled in bearings 42 carried by cross bearers 43 connected with the framework of the fuselage. For the purpose of controlling the elevating planes H, $H^1$ the joystick J is provided upon the opposite sides of the pivots 49 with pivoted links 44, which latter in turn are connected to the elevating planes H, $H^1$ through the flexible cables $j$ proceeding from the links 44 to the levers 28 on the said elevating planes in the usual manner. Such an arrangement permits the elevating planes to be moved upwardly or downwardly according as either joystick J or $J^1$ is moved rearwardly or forwardly from the vertical position. As clearly shown in Fig. 3 the lower extremity of the joystick J is operatively connected with the lower extremity of the joystick $J^1$ by means of an upwardly curved rod 45 so that upon fore and aft movement of one joystick corresponding movement will be imparted to the other.

For the purpose of controlling the ailerons F (Figs. 1 and 2) the shaft 41 is operatively connected to the ailerons through the medium of a segmental pulley or quadrant 46 secured to the intermediate portion of the shaft 41, and from which pulley connection is made to the ailerons of the lower planes by cables 47 passing in opposite directions around a circular pulley 48, rotatably mounted upon one of the bottom fuselage struts. On their way to the lower ailerons, to which they are attached by actuating levers 71, these cables 47 pass around pulleys 72 fixed upon the lower planes. The segmental pulley 46 is formed upon its periphery with two grooves, one for each of the wire cables 47, and the inner ends of the cables 47 are respectively secured to the upper ends of the grooves, but on opposite sides of the pulley 46. The cables, proceeding thence around the pulley 48 in opposite directions as aforesaid, are led along in an approximately horizontal direction beneath the lower wings. These cables may be duplicated, but in the present instance I have shown only one pair of cables in order to simplify the drawings.

It will be apparent from Fig. 4 of the drawings that the horizontal portions of the cables 47 beneath the bottom planes move simultaneously in the same direction and to the same extent, and therefore suitable points in each may be coupled together by a taut "lazy" wire 73 so that in effect the lower ailerons are coupled by one continuous wire. It will be readily understood that this arrangement tends to mitigate the stresses on the control mechanism within the body.

From the foregoing description, it will be evident that the shaft 41 may be actuated by lateral movement of either joystick and that when the shaft is partially rotated in either direction from the position shown in Fig. 3, a corresponding differential movement is imparted to the bottom aileron control cables 47 through the agency of the segmental pulley 46, whereby the ailerons of the bottom plane will be differentially deflected in one sense, or in the other, according to the direction in which the shaft 41 is rotated.

In the biplane machine illustrated in the drawings the upper surfaces of the bottom ailerons are connected to the lower surfaces of the top ailerons by coupling wires 68; and the upper surfaces of the top ailerons have actuating levers 69 similar to the levers 71 beneath the lower ailerons. The actuating levers 69 are connected together by a cable 70 passing around pulleys 74 and straight across above the top wings without interruption. Thus it will be seen that all four ailerons are connected together by an unbroken circuit of actuating cables and must move simultaneously, and it will also be apparent that actuation of the joysticks to raise the ailerons on one side of the machine essentially causes those on the other side to be depressed, and vice versa.

As each joystick J and $J^1$ is free to move about its pivot to actuate the elevating planes, and to swing laterally about the axis of the shaft 41 as a center to actuate the ailerons, it will be obvious that both the ailerons and elevating planes may be simultaneously actuated by one movement of either joystick. For instance supposing that it is desired to raise the elevating planes and simultaneously to alter the lateral trim of the main planes, the operator may, by swinging either joystick backward and at the same time partially rotating the shaft 41 simultaneously actuate both the elevating planes and ailerons. It will be further noted that such an arrangement permits either the ailerons or elevating planes to be returned to their normal positions independently of each other, that is, when the ailerons, for instance, are deflected and the joysticks occupy a corresponding position, the elevating planes may be actuated by fore and aft movement of the joysticks without displacing the ailerons by lateral movement.

As shown in Fig. 3, the joystick $J^1$ is formed of two sections, the upper section 52 being provided with a socket 51 which fits detachably over the lower section 50' so that it may be removed when not actually in use by the passenger.

The dual control for the rudder K is shown in detail in Figs. 3, 4 and 7. In this connection I provide a pair of foot operated levers 53 and 54 which are inter-connected for simultaneous movement by means of wires 55. The levers 53, 54 are pivoted centrally of their length upon brackets 56, which latter comprise divergent limbs, secured at their free ends to adjacent cross bearers 34. The lever 53 is operatively connected to the rudder K by means of the cables 57 so that when the lever 53 is rocked upon its pivot the rudder can be swung in either direction. To connect the cables 57 with the wires 55, I provide links 58 which are pivotally secured adjacent the opposite ends of the lever 53. The cables 57 connect with levers such as 65 attached to the vertical rudder K so that movement of either of the foot levers 53 or 54 oscillates the said rudder K, the cables 57 passing out through the top of the fuselage, as shown in Fig. 2.

The levers 53 and 54 are formed at their ends with stirrups 59, so that the feet of the operators will not readily slip off the levers. To restrict the amplitude of movement of each lever 53 and 54 and to restrict their movements to a true horizontal plane, I provide guides 60 secured to the longitudinal seat bearers 61, the guides 60 coöperating with the underside of the seat bearers to form a slot in which the lever is adapted to work.

For supporting and guiding the feet of the operators when actuating the levers 53 and 54, the cross bearers 34 and 43 have secured thereto brackets 62 which support foot rests 63 directly below the levers 53 and 54. These foot rests are each provided with an upstanding peripheral ridge for the purpose of maintaining the operators' feet upon the rests, and at the same time guiding the feet while moving the levers.

I claim:

1. A control for aeroplanes, comprising a rotatable shaft, a segmental member attached thereto, a circular pulley, flexible connections between said segmental member and ailerons on the main planes, said flexible connection crossing between said segmental member and said circular pulley and passing around said circular pulley, so that it passes from opposite sides of the segmental member in opposite directions around said circular pulley, a hand control lever pivotally mounted on said rotatable shaft so that it will oscillate longitudinally in relation thereto and transversely therewith, the pivotal axis of said lever intersecting the axis of the rotatable shaft, an extension of said lever below said rotatable shaft and flexible connections from said lever and said extension to elevating planes supported at the rear of the aeroplane.

2. A control for aeroplanes, comprising a rotatable shaft, a segmental member attached thereto, a circular pulley, flexible connections between said segmental member and ailerons on the main planes, said flexible connections crossing between said segmental member and said circular pulley and passing around said circular pulley, so that it passes from opposite sides of the segmental member in opposite directions around said circular pulley, a hand control lever pivotally mounted on said rotatable shaft so that it will oscillate longitudinally in relation thereto and transversely therewith, the pivotal axis of said lever intersecting the axis of the rotatable shaft, an extension of said lever below said rotatable shaft and flexible connections from said lever and said extension to elevating planes supported at the rear of the aeroplane, a cross bearer in front of said hand control lever, a bracket secured to the rear face of said cross bearer and projecting rearwardly thereof, a foot control lever pivoted centrally on said bracket, and flexible means connecting said foot lever to the rudder of the aeroplane.

3. A foot control for aeroplanes comprising a front cross bearer and a rear cross bearer, a bracket attached to the rear face of the front cross bearer and projecting rearwardly, said bracket comprising two superimposed pairs of converging limbs, a foot control lever centrally pivoted to said bracket structure on an axis passing through the points of convergence of said limbs, a pair of longitudinal bearers mounted on the cross bearers and guide members suspended from said longitudinal bearers, and foot guiding members suspended from said cross bearers.

4. A control for aeroplanes, comprising a rotatable shaft, a segmental member attached thereto, a circular pulley, flexible connections between said segmental member and ailerons on the main planes, said flexible connection crossing between said segmental member and said circular pulley and passing around said circular pulley, so that it passes from opposite sides of the segmental member in opposite directions around said circular pulley, a pair of hand control levers each mounted for pivotal movement on said rotatable shaft in two intersecting planes, an extension on each of said control levers below the respective mounting axis, a coupling rod passing through said segmental member and flexible connections between one of said levers and elevating planes supported at the rear of the aeroplane.

5. A dual control for aeroplanes comprising a rotatable shaft, a segmental member fixed to said shaft, a circular pulley rotatably mounted below said segmental member, flexible control actuating means passing from opposite sides of said segmental member in opposite directions around said circular pulley or pulleys to the ailerons of the aeroplane, a pair of levers fulcrumed to the first mentioned shaft, and a coupling rod passing freely through said segmental member and operatively connecting said levers for simultaneous movement.

6. A dual control for aeroplanes comprising a rotatable shaft, a segmental pulley, a main hand control lever and auxiliary hand control lever pivotally supported by said shaft so as to be capable of oscillatory movement, extensions of the said control levers, a coupling rod operatively connecting the said extensions for simultaneous longitudinal movement, a circular pulley rotatably mounted below said segmental member, flexible control actuating means passing from opposite sides of said segmental member in opposite directions around said circular pulley to the ailerons of the aeroplane, and flexible means connecting the extension of one of the hand control levers with the elevating planes of the aeroplane.

7. A dual control for aeroplanes comprising a rotatable shaft, a segmental pulley, a main hand control lever and auxiliary hand control lever pivotally supported by said shaft so as to be capable of oscillatory movement, extensions of the said hand control levers, a coupling rod operatively connecting the said extensions for simultaneous longitudinal movement, a circular pulley rotatably mounted below said segmental member, flexible control actuating means passing from opposite sides of said segmental member in opposite directions around said circular pulley to the ailerons of the aeroplane, flexible means connecting the extension of one of the hand control levers with the elevating planes of the aeroplane, a horizontally disposed pair of interconnected foot control levers pivoted for rocking movement, stirrups formed on the opposite ends of said foot control levers, and foot-guiding members disposed below said foot control levers, all substantially as and for the purpose set forth.

In testimony whereof I affix my signature.

ALLIOTT VERDON ROE.

Witnesses:
HARVEY J. BAVERSTORT,
CHARLES PACK.